United States Patent [19]

Shuto

[11] 4,284,181
[45] Aug. 18, 1981

[54] RIGID TROLLEY RAIL AND METHOD FOR LAYING THE SAME

[75] Inventor: Masamoto Shuto, Tokyo, Japan

[73] Assignee: Japan Air Line Co., Ltd., Tokyo, Japan

[21] Appl. No.: 67,761

[22] Filed: Aug. 17, 1979

[30] Foreign Application Priority Data

Aug. 17, 1978 [JP] Japan .................................. 53-100187

[51] Int. Cl.³ .............................................. B60M 1/00
[52] U.S. Cl. ........................ 191/22 DM; 191/29 DM; 238/143
[58] Field of Search ................... 191/22 DM, 29 DM; 238/140, 143, 146, 147

[56] References Cited

U.S. PATENT DOCUMENTS

| | | | |
|---|---|---|---|
| 3,813,502 | 5/1974 | Bommart | 191/29 DM X |
| 3,850,270 | 11/1974 | Hillmann | 191/29 R |
| 3,902,579 | 9/1975 | Howell | 238/143 X |

FOREIGN PATENT DOCUMENTS 2435641  2/1975  Fed. Rep. of Germany .... 191/22 DM

Primary Examiner—Richard A. Schacher
Attorney, Agent, or Firm—Wenderoth, Lind & Ponack

[57] ABSTRACT

A rigid trolley rail having a continuous unified structural body which is formed by continuously laying a plurality of short trolley rail bodies made of aluminum along the track of a travelling body and by mechanically connecting or welding confronting ends of adjacent trolley rail bodies to each other. Each of the plurality of aluminum trolley rail bodies consists of a base part attached to fixed support parts, a protruding middle part formed to protrude from the middle portion of the upper or lower face of the base part approximately into a T-shape; and a pair of protruding clamping strips positioned with the protruding middle part interposed between them. A long single sheet of stainless steel is bent to cover the protruding middle parts of the aligned rail bodies to form the continuous unified structural body and the ends of the two bent sides thereof are fixed in a gripping manner by bending the pair of protruding clamping strips inwardly to clamp the bent sides against the base part.

2 Claims, 4 Drawing Figures

RIGID TROLLEY RAIL AND METHOD FOR LAYING THE SAME

BACKGROUND OF THE INVENTION

1. Field of the Invention

This invention relates to a rigid trolley rail (hereinafter simply called a trolley rail) and a method for laying the same.

2. Description of the Prior Art

In cases where a trolley rail used for a high speed travelling body such as a linear motor car has joints at close intervals, current collecting contactors attached to the travelling body frequently pass over these joints. This not only produces noises but tends to damage the contactors. Hence, it has been desired to make each portion of a trolley rail as long as possible to have a smaller number of joints between portions.

On the other hand, for a high speed travelling body, use of a trolley rail of a so-called stringing type sometimes brings about a rail detaching phenomenon due to the high travelling speed. To prevent such detachment, it has been proposed to use a current collecting system which has a trolley rail of a rigid type and the rigid trolley rail is arranged to be held between a pair of contactors. However, even if a long rigid trolley rail measuring, say, several hundred meters could be prepared, it is hardly possible to carry it to a construction site. Therefore, it is difficult to make each trolley rail long.

The present invention is directed to a method for laying a trolley rail which makes it possible to lay the rail with a smaller number of joints than heretofore by virtue of an improvement in the structural arrangement which solves the above described problems heretofore encountered with the conventional trolley rails.

SUMMARY OF THE INVENTION

It is an object of the invention to provide a rigid trolley rail comprising a continuous unified structural body which is formed by laying a plurality of short trolley rail bodies made of aluminum in succession along a track of a travelling body and by mechanically connecting or welding confronting ends of adjacent trolley rail bodies to each other, each of the plurality of aluminum trolley rail bodies consisting of a base part attached to fixed support parts, a protruding part formed to protrude from the middle portion of the upper or lower face of the base part approximately into a T-shape and a pair of protruding clamping strips on opposite sides of the protruding middle part; and a single sheet of stainless steel (for example, AISI 304 austenitic stainless steel) which is bent to cover the successively arranged protruding parts of the continuous unified structural body and the ends of the two bent sides thereof gripped by bending the pair of protruding clamping strips inwardly against the base part.

It is another object of the invention to provide a method for laying a rigid trolley rail comprising laying a plurality of constituent short trolley rail bodies made of aluminum in succession along a track of a travelling body and mechanically connecting or welding confronting ends of adjacent trolley rail bodies to each other to obtain a continuous structural body, each of the plurality of aluminum trolley rail bodies consisting of a base part attached to fixed support parts, a protruding middle part protruding from the middle portion of the upper or lower face of the base part approximately in a T-shape and a pair of protruding clamping strips on opposite sides of said protruding middle part; and unwinding a long coiled stainless steel band and placing it on the top end faces of the protruding middle parts of the trolley rail bodies one after another and bending the left and right sides of the unwound stainless steel band around the sides of the protruding middle part to cover the aligned protruding parts, and then clamping the ends of the two bent sides in place by bending the pair of clamping strips against the protruding base part.

The above and other related objects, advantages and features of the present invention will be understood from the following description of an embodiment thereof when read in connection with the accompanying drawings.

DETAILED DESCRIPTION OF PREFERRED EMBODIMENT

Figure 1:
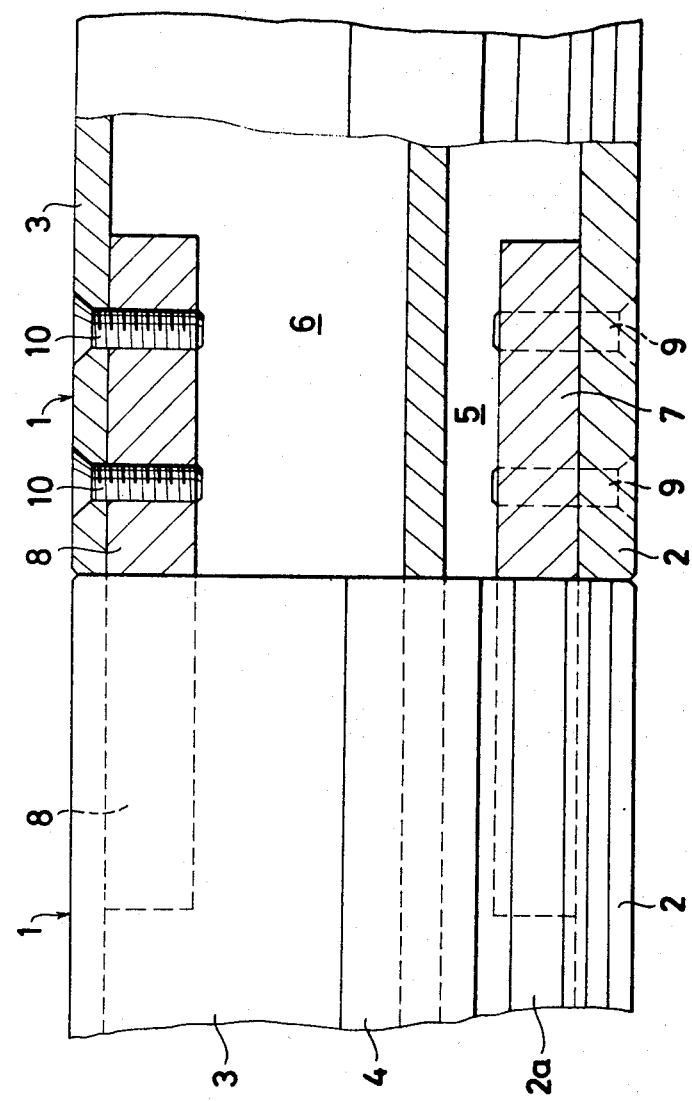
FIG. 1 is a partly sectional side elevation view showing a trolley rail according to one embodiment of the present invention.

In the accompanying drawings, reference numeral 1 designates a trolley rail body made of aluminum. The trolley rail body is relatively short measuring about 20 to 50 meters in length, and comprises a base part 2 which has a cross-sectional hollow box-like shape with grooves 2a provided in the left and right sides thereof for supporting a pair of left and right rotating rolls 12 attached to a fixed support 11 and upwardly and inwardly slanting surfaces 2b on the upper portion thereof; a protruding middle part 3 which protrudes upward from the middle of the upper side of the base part 2 between the upper ends of slanting surfaces and which has a cross-sectional hollow rectangular shape with substantially vertical side surfaces; and a pair of protruding clamping strips 4 projecting upwardly from the lower ends of slanting surfaces 2b. The reference numerals 5 and 6 designate the hollows formed in the base part 2 and the protruding part 3. There are provided a large number of fixed supports 11 with proper spacing between them in the direction of the trolley rail. Each of the fixed supports 11 is provided with the pair of rotating rolls 12 for carrying each constituent trolley rail body in such a way as to allow it to move in the direction in which the rail is to be laid.

A plurality of the trolley rail bodies 1 which are carried by the fixed support 11 are continuously laid one after another in the direction of their length without leaving any gap between them. Then, the confronting adjacent ends of these trolley rail bodies are caused to abut each other as they can be joined by a mechanical connection. To effect this mechanical connection, confronting ends of the adjacent trolley rail bodies are brought into contact with each other, coupling metal pieces 7 and 8 are inserted into the hollow parts 5 and 6 of the base and protruding parts of the adjoining pair of trolley rail bodies respectively to straddle them, and the coupling metal pieces secured thereto by bolts 9 and 10.

Figure 2:
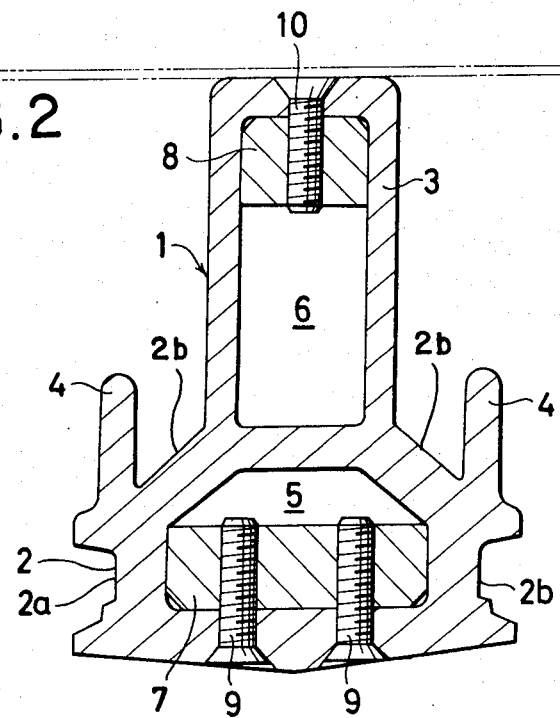
FIG. 2 is a transverse sectional view showing the trolley rail body of FIG. 1 state prior to covering it with a thin sheet of stainless steel.
Figure 4:
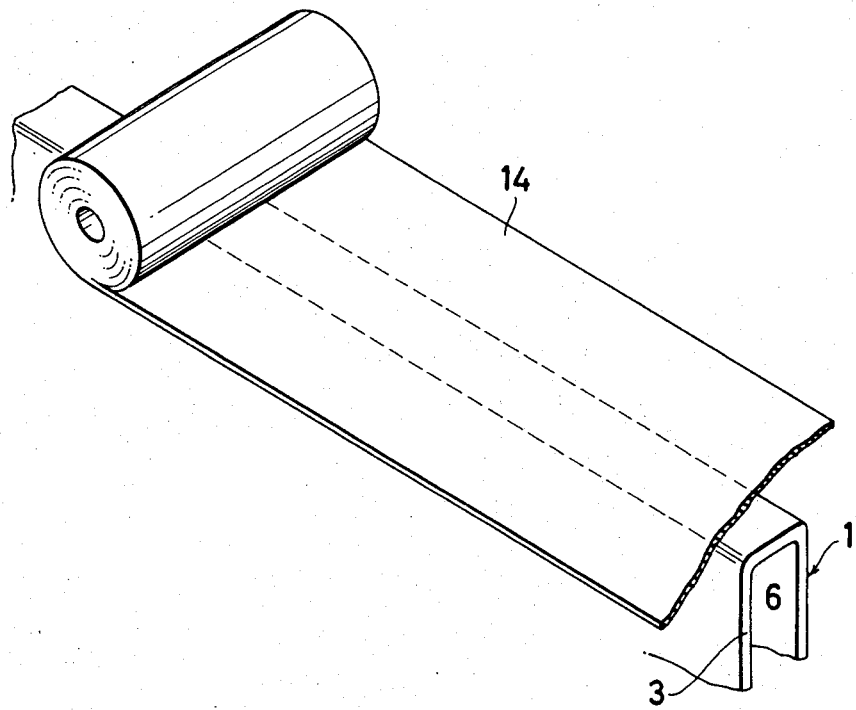
FIG. 4 is a perspective view showing a step in the laying method of the invention.

The mechanical connection described is only exemplary and does not mean to exclude connecting by welding. Generally, when the connection is effected by welding, the heat of welding tends to leave a strain in the welded part and this would affect the precision with which the trolley rail is laid or would cause a deformation under a thermal influence after completion of the laying work. Moreover, in order to obtain good and consistent contact between the contact elements of the current correcting system of a travelling body and the rail, it is necessary to maintain the contacting surface of the trolley rail in a highly conductive state. However, with a conventional aluminum trolley rail, the contacting surface may become corroded due to adhesion of rain water, etc. thereon, thus causing increased electrical resistance and in the worst cases seriously roughening the surface due to resistance heating and the earth discharge. In the case of the present invention, however, the trolley rail bodes 1 are covered by a stainless steel band as described hereinafter. Therefore, there will be few adverse effects of such a strain. FIG. 2 is a sectional view showing the trolley rail bodies connected to each other in the manner as described above. A plurality of the trolley rail bodies 1 which are connected in this manner have their protruding parts 3 covered with a long single sheet of a stainless steel (AISI 304 type) 13.

Figure 3:
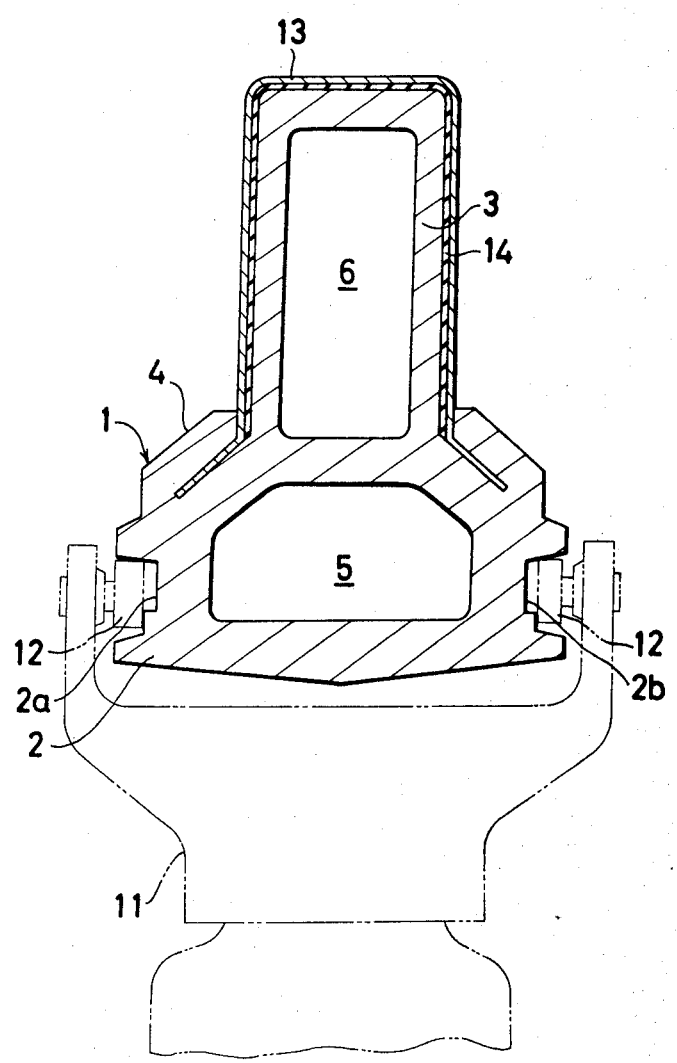
FIG. 3 is a transverse sectional view showing the trolley rail as after completion of laying.

In other words, a long stainless steel band 13 which is wound in a coil shape is gradually unwound over the top faces of the protruding parts of the successive aligned trolley rail bodies 1. As the coil of stainless steel is thus being gradually unwound, the left and right sides of the unwound portion of the thin sheet of stainless steel 13 are bent in such a way as to cover the sides of the protruding parts 3 one after another and extend to the lower ends of the slanting surfaces 2b. Then, the ends of the two bent sides of the thin sheet 13 are clamped by bending the pair of the clamping strips 4 against the slanting surfaces 2b. FIG. 3 is a sectional view showing the trolley rail after the stainless steel band 13 is fixed in place. In FIG. 3, reference numeral 14 designates a moisture proof or vibration absorbing layer such as an asphalt material or the like which is interposed between the protruding part 3 of the trolley rail body 1 and the stainless steel band 13. Further, it is preferred that an anticorrosive material be applied to the pair of clamping strips 4.

In the trolley rail which is constructed and laid as described in the foregoing, the joints between the plurality of successive short trolley rail bodies are covered by a single long sheet of stainless steel. Therefore, there is no possibility that these joints will produce the aforesaid undesirable effects. In accordance with the present invention, therefore, it is possible to lay a trolley rail which is virtually jointless over a length of more than several hundred meters.

As described in the foregoing, in accordance with the present invention, relatively short rigid trolley rail bodies made of aluminum and a long stainless steel sheet material wound up into a coil, all of which are transportable, are used in combination to obtain a long jointless trolley rail. The invention, therefore, has great advantages for practical application thereof.

What is claimed is:

1. A trolley rail structure comprising:
   a plurality of aluminum rail bodies each having a cross-sectional shape with a hollow box-like base portion having upwardly and inwardly slanting surfaces on the upper portion thereof and a protruding middle part extending upwardly from the middle of the upper side of said base portion between the upper ends of said slanting surfaces and having a hollow rectangular cross-section with substantially vertical side surfaces, and a pair of clamping strips projecting upwardly from the upper side of said base portion at the lower ends of said slanting surfaces; said aluminum rail being in end to end abutment in the direction of the rail and having connecting means in the hollows of said rail bodies connecting the bodies to each other; and a thin strip of stainless steel extending along the upper surfaces of the protruding middle parts of successive rails and having the edge portions thereof bent downwardly against the vertical side surfaces of said middle parts and against the slanting surfaces of said base parts, and said clamping strips being bent inwardly toward said middle parts and against the lower edges of said strip lying against said slanting surfaces for clamping said lower edges against said slanting surfaces.

2. A method of making a trolley rail structure comprising:
   laying a plurality of aluminum rail bodies end to end, each rail body having a cross-sectional shape with a hollow box-like base portion having upwardly and inwardly slanting surfaces on the upper portion thereof and a protruding middle part extending upwardly from the middle of the upper side of said base portion between the upper ends of said slanting surfaces and having a hollow rectangular cross-section with substantially vertical side surfaces, and a pair of clamping strips projecting upwardly from the upper side of said base portion at the lower ends of said slanting surfaces; connecting said aluminum rail bodies to each other in end to end abutment by connecting means inserted into the hollows of said rail bodies; laying a thin strip of stainless steel along the upper surfaces of the protruding middle parts of successive rails; bending the edge portions of said strip bent downwardly against the vertical side surfaces of said middle parts and against the slanting surfaces of said base parts; and bending said clamping strips inwardly toward said middle parts and against the lower edges of said strip lying against said slanting surfaces for clamping said lower edges against said slanting surface.

* * * * *